UNITED STATES PATENT OFFICE.

GEORGE THOMPSON, OF EAST TARENTUM, PENNSYLVANIA.

IMPROVEMENT IN BOXES FOR PRESERVING ALKALIES.

Specification forming part of Letters Patent No. 18,214, dated September 15, 1857; Reissue No. 657, dated February 8, 1859.

*To all whom it may concern:*

Be it known that I, GEORGE THOMPSON, of East Tarentum, in the county of Allegheny and State of Pennsylvania, have invented a new and useful Improvement in Air-Tight Packages for Putting up Caustic Soda and Potash; and I do hereby declare that the following is a full, clear, and exact description thereof.

My invention consists in the use of small boxes constructed of sheet-iron or other metal, and united with a cement which is infusible as the degree of heat at which the hydrated alkalies of soda and potassa remain fused, for the purpose of putting up those alkalies in small air-tight packages. The hydrated alkalies of soda and potassa, commonly known as "caustic soda" and "potash" are highly concentrated alkalies, which, on account of their corrosive qualities and their liability to deliquesce when exposed, even for a short time, to the action of the atmosphere, require to be kept in air-tight packages, and therefore cannot be introduced into general use for domestic purposes unless the package is made so small that its entire contents may be used immediately after it is broken open.

In using metallic boxes for putting up either caustic soda or potash it is necessary, in order to insure the exclusion of all air from the boxes, to pour the caustic alkali into the boxes while in a melted state, and when it is so hot that it will char a stick or chip plunged into it. This renders it impossible to put the boxes together, or seal them up with common solder or any cement which will melt at the high heat of caustic soda in a fused condition.

The following mode of putting up these caustic alkalies I have found to be completely successful: I construct small cylindrical boxes of very thin sheet-iron or other metal. The piece which forms the cylinder or body of the box is united at its edges by a lapped joint pressed firmly together by machinery. The top and bottom of the box are each a circular disk of the same material, of proper diameter, the edge of which is turned up by machinery. The bottom is fastened to the cylinder by laying cement which is infusible at the temperature of melted caustic soda, and which is composed of fire-clay moistened with linseed-oil, around the turned-up edge of the bottom piece, and then pressing the cylindrical body of the box down into it. When the cement around the bottom is sufficiently dry, the melted caustic soda or potash is poured from a ladle into the boxes, a number of which are arranged side by side for that purpose, care being taken to fill the boxes brimful, so as to leave no cavity for air when the lid is on. The top piece or lid is similarly constructed to the bottom piece, and, like it, has cement laid inside of the turned-up edge. When the boxes are filled, and while the caustic alkali is yet red-hot, the top piece is forced down to its place. When thus closed, the boxes may be dried in a kiln to insure the setting of the cement, and then each box is dipped in a kettle of varnish, which renders certain the perfect sealing of the box and the exclusion of all atmospheric air from without. When thus put up, these caustic alkalies will keep almost any length of time. These boxes are made of such size as to hold a certain fixed quantity of the caustic soda or potash, and being put up in small boxes, these articles are made accessible to the public for domestic and other purposes, and are found highly useful, whereas as ordinarily put up in large quantities they could not be generally used except in manufactories, because when an original package is opened, the air being once admitted, the whole contents will soon deliquesce unless speedily used.

What I claim as my invention, and desire to secure by Letters Patent, is—

The use of metallic boxes constructed as described, and united with cement infusible at the degree of heat at which the caustic alkalies of soda and potassa remain fluid, for the purpose of putting up those caustic alkalies in small quantities, as described.

GEORGE THOMPSON.

Witnesses:
L. P. STONE,
W. BAKEWELL.